United States Patent [19]

Matsumoto

[11] Patent Number: 5,444,134
[45] Date of Patent: Aug. 22, 1995

[54] PROCESS FOR PRODUCING OLEFIN BASED POLYMERS AND OLEFIN POLYMERIZATION CATALYST

[75] Inventor: Junichi Matsumoto, Sodegaura, Japan

[73] Assignee: Idemitsu Kosan Co., Ltd., Tokyo, Japan

[21] Appl. No.: 911,478

[22] Filed: Jul. 10, 1992

[30] Foreign Application Priority Data

Jul. 11, 1991 [JP] Japan .................. 3-197188
Jan. 8, 1992 [JP] Japan .................. 4-019558

[51] Int. Cl.$^6$ .................................................. C08F 4/44
[52] U.S. Cl. .................... 526/159; 526/130; 526/134; 526/160; 526/171; 526/346; 526/347
[58] Field of Search ............... 526/130, 134, 159, 160, 526/170, 171, 346, 347

[56] References Cited

U.S. PATENT DOCUMENTS

| | | | |
|---|---|---|---|
| 3,135,809 | 6/1964 | Bosmajian | 502/114 |
| 5,064,802 | 11/1991 | Stevens et al. | 526/170 |
| 5,066,741 | 11/1991 | Campbell, Jr. | 526/171 |
| 5,241,025 | 8/1993 | Hlatky et al. | 502/103 |

FOREIGN PATENT DOCUMENTS

| | | |
|---|---|---|
| 0277003 | 8/1988 | European Pat. Off. |
| 0277004 | 8/1988 | European Pat. Off. |
| 0279863 | 8/1988 | European Pat. Off. |
| 0426637 | 5/1991 | European Pat. Off. |
| 0481480 | 4/1992 | European Pat. Off. |
| WO91/09882 | 7/1991 | WIPO |

OTHER PUBLICATIONS

Journal of the American Chemical Society, vol. 108, 1986, pp. 1718–1719, R. F. Jordan, et al.
Die Makromolekulare Chemie, Rapid Communications, vol. 12, No. 6, Jun. 1991, pp. 367–372, XP232517, Kaminaka, et al.
Section Ch, Week 9226, Jun. 11, 1992, Derwent Publications Ltd., Class A17, AN 92-217032, WO-A-9 209 640, N. Ishihara, et al.

*Primary Examiner*—Asok Pal
*Attorney, Agent, or Firm*—Oblon, Spivak, McClelland, Maier, & Neustadt

[57] ABSTRACT

Olefin polymerization is carried out in the presence of a catalyst comprising, as main components, the following Compounds (A) and (B):

(A) a transition metal compound containing a transition metal selected from the IVB Group of the Periodic Table having the formula:

$$M^1R^1_aR^2_bR^3_cR^4_d$$

wherein $M^1$ is a Ti, Zr, or Hf atom; a, b, c, and d are independently an integer of 0 to 4; and $R^1$, $R^2$, $R^3$ and $R^4$ are selected from the group consisting of hydrogen atom, oxygen atom, halogen atom, $C_{1-20}$ alkyl, $C_{1-2}$ alkoxy, $C_{6-20}$ aryl, tolyl, xylyl, benzyl, $C_{1-20}$ acyloxy, allyl, trimethylsilyl, and (trimethylsilyl)methyl, acetylacetonate, substituted acetylacetonate, dimethyl ether, diethyl ether, tetrahydrofuran, tetrahydrothiophene, ethylbenzoate, acetonitrile, benzonitrile, trimethylamine, triethylamine, tributylamine, N,N-dimethylaniline, pyridine, 2,2′-bipyridine, phenanatholorine, triethylphosphine, triphenylphosphine, ethylene, butadiene, 1-pentene, isoprene, pentadiene, 1-hexene, benzene, toluene, xylene, cycloheptatriene, cyclooctadiene, cyclooctatriene, and cyclooctatetraene; and (B) a boron compound wherein at least one of Compounds (A) and (B) is carried on a carrier; and an organoaluminum compound.

According to the present invention, an olefin homopolymer or a copolymer of olefins having excellent properties such as high bulk density, can be effectively produced without using a great amount of an organoaluminum compound.

13 Claims, No Drawings

PROCESS FOR PRODUCING OLEFIN BASED POLYMERS AND OLEFIN POLYMERIZATION CATALYST

BACKGROUND OF THE INVENTION

1. Field of the Invention:

The present invention relates to a process for effectively producing an olefin homopolymer or an olefin copolymer. The present invention also relates to a catalyst used for olefin polymerization.

2. Related Art:

Heretofore, the Kaminsky type catalysts containing a transition metal compound and aluminoxane have been known as a soluble olefin polymerization catalyst. For example, the following catalysts are known. In the alpha-olefin polymerization, a catalyst composed of a zirconium compound and aluminoxane shows high polymerization activity (Japanese Patent Application Unexamined Publication No. Sho 58-19309). Stereo-regular polypropylene is produced using a catalyst composed of a zirconium compound having a ligand in which two indenyl groups are connected through an ethylene group, and aluminoxane (JP Pat. Appln. Unexamined Pub. No. Sho 61-130314). It is said that using these Kaminskey type catalysts, for example, in the propylene polymerization, any of isotactic polypropylene, atactic polypropylene and syndiotactic polypropylene can be produced (Macromol. Chem., Rapid Commun. 4,417–421 (1983); Angew. Chem. Int. Ed. Engl. 24,507–508 (1985); J. Am. Chem. Soc. 109,6544–6545 (1987); and J. Am. Chem. Soc. 110,6255–6256 (1988)).

In this case, as a transition metal compound useful for producing isotactic polypropylene, a transition metal compound having an ethylene bis(indenyl) ligand (JP Pat. Appln. Unexamined Pub. No. Sho 61-264010; Sho 64-51408; and Sho 64-66216); $R(C_5(R')_4)_2MeQ_p$ type metallocene compound reported by Ewen et al (JP Pat. Appln. Unexamined Pub. No. Sho 63-251405; Sho 63-295607; and Sho 64-74202); a metallocene compound cross-linked with silicon or the like (JP. Pat. Appln. Unexamined Pub. No. Hei 3-12406); and the like are known. Further, a metallocene compound useful for producing a stereo-block polymer is known (JP Pat. Appln. Unexamined Pub. No. Sho 63-142004 and Sho 63-2005).

However, the above-mentioned polymerization methods require use of a great amount of expensive aluminoxane to obtain sufficient activity, resulting in increase in cost.

Further, since a great amount of aluminoxane is used, a substantial amount of metal will remain in the polymerized products, resulting in deterioration and coloring of the products. In these processes, after polymerization, deashing treatment of the resultant products should be sufficiently conducted. Thus, these processes have a problem in productivity.

Further, aluminoxane is produced from the reaction of highly reactive trimethylaluminum and water, leading to risks. Furthermore, the reaction product is a mixture of several materials containing unreacted materials, and it is quite difficult to isolate one single substance. Thus, management of catalysts to obtain a product having stable physical properties is quite difficult.

On the other hand, Japanese Patent Application PCT Publication No. Hei 1-502036 discloses a polymerization process for producing an alpha-olefin polymer using, as a catalyst, a specific boron complex containing a specific amine and a metallocene compound.

However, the catalyst used in the above-mentioned process shows extremely low polymerization activity. Further, it is difficult to apply this process to industrial use since the resultant polymer is in the bad shape, leading to low bulk density.

Further, JP Pat. Appln. Unexamined Pub. No. Hei 03-74411 and Hei 03-74412 disclose olefin polymerization employing a catalyst wherein at least one of a transition metal compound and aluminoxane is carried on a carrier made of a granule polymer or an inorganic particle. However, these process require use of a great amount of aluminoxane, and thus are not suitable for industrial use for the same reasons.

Further, International Publication 91/09882 and JP. Pat. Appln. Unexamined Pub. No. Hei 03-234709 propose an olefin polymerization catalyst wherein a specific transition metal compound is carried on a carrier. However, in these catalysts, the catalyst components are limited and these are not always satisfactory for industrial use.

SUMMARY OF THE INVENTION

The present invention was made in view of the above-mentioned situations and has its object of providing an olefin polymerization method which can produce an olefin based polymer having excellent properties, i.e., an spherical olefin based polymer having high bulk density and narrow particle size distribution. Further, it is another object of the present invention to provide an olefin polymerization catalyst capable of such polymerization.

To achieve the above objects, the present invention provides a process for polymerizing an olefin which employs a catalyst comprising, as main components, the following Compounds (A) and (B):

(A) a transition metal compound containing a transition metal selected from the IVB Group of the Periodic Table; and (B) a compound capable of forming an ionic complex when reacted with a transition metal compound, wherein at least one of Compounds (A) and (B) is carried on a carrier; and an organoaluminum compound.

Further, the present invention provides an olefin polymerization catalyst which comprises, as main components, the following Compounds (A') and (B):

(A') a specific transition metal compound containing a transition metal selected from the IVB Group of the Periodic Table; and (B) a compound capable of forming an ionic complex when reacted with a transition metal compound, wherein at least one of Compounds (A') and (B) is carried on a carrier.

DETAILED DESCRIPTION OF THE INVENTION

The present invention will be described in more detail below.

In the present invention, Compounds (A) are those containing a transition metal belonging to the IVB Group of the Periodic Table, i.e., titanium (Ti), zirconium (Zr) or hafnium (Hf). More preferred are cyclopentadienyl compounds represented by the following Formula (I), (II) or (III), or derivatives thereof, or compounds represented by the following Formula (IV) or derivatives thereof.

$$CpM^1R^1{}_aR^2{}_bR^3{}_c \quad \text{(I)}$$

$$Cp_2M^1R^1{}_aR^2{}_b \quad \text{(II)}$$

$$(Cp\text{-}A_e\text{-}Cp)M^1R^1{}_aR^2{}_b \quad \text{(III)}$$

$$M^1R^1{}_aR^2{}_bR^3{}_cR^4{}_d \quad \text{(IV)}$$

In Formulas (I) to (IV), $M^1$ is a Ti, Zr or Hf atom; Cp is a group having an unsaturated cyclic hydrocarbon such as a cyclopentadienyl group, substituted cyclopentadienyl group, indenyl group, substituted indenyl group, tetrahydroindenyl group, substituted tetrahydroindenyl group, fluorenyl group or substituted fluorenyl group; $R^1$, $R^2$ $R^3$ and $R^4$ are independently a ligand having a sigma bond, chelate ligand or Lewis base ligand; the ligands having a sigma bond include a hydrogen atom, oxygen atom, halogen atom, $C_{1-20}$ alkyl group, $C_{1-20}$ alkoxy group, $C_{6-20}$ aryl group, alkylaryl group, arylalkyl group, $C_{1-20}$ acyloxy group, allyl group, substituted allyl group, a substituent containing a silicon atom; the chelate ligands include an acetylacetonate group and substituted acetylacetonate group; A is a bridge based on a covalent bond; a, b, c and d are independently an integer of 0 to 4; e is an integer of 0 to 6; and two or more of $R^1$, $R^2$, $R^3$ and $R^4$ may form a ring. If the above-mentioned Cp has a substituent, the substituent is preferably a $C_{1-20}$ alkyl group. In Formulas (II) and (III), two of Cp may be the same as or different from each other.

In the above Formulas (I) to (III), the substituted cyclopentadienyl groups include, for example, a methylcyclopentadienyl group, ethylcyclopentadienyl group, isopropylcyclopentadienyl group, 1,2-dimethylcyclopentadienyl group, tetramethylcyclopentadienyl group, 1,3-dimethylcyclopentadienyl group, 1,2,3-trimethylcyclopentadienyl group, 1,2,4-trimethylcyclopentadienyl group, pentamethylcyclopentadieyl group, and trimethylsilylcyclopentadienyl group.

Examples of $R^1$ to $R^4$ in the above Formulas (I) to (IV), include halogen atoms such as a fluorine atom, chlorine atom, bromine atom and iodine atom; $C_{1-20}$ alkyl groups such as a methyl group, ethyl group, n-propyl group, isopropyl group, n-butyl group, octyl group and 2-ethylhexyl group; $C_{1-20}$ alkoxy groups such as a methoxy group, ethoxy group, propoxy group, butoxy group and phenoxy group; $C_{6-20}$ aryl groups alkylaryl groups or arylalkyl group, such as a phenyl group, tolyl group, xylyl group and benzyl group; $C_{1-20}$ acyloxy groups such as a heptadecylcarbonyloxy group; substituents containing a silicon atom such as a trimethylsilyl group, (trimethylsilyl)methyl group; Lewis bases such as ethers including dimethyl ether, diethyl ether and tetrahydrofuran, thioethers including tetrahydrothiophen, esters including ethylbenzoate, nitriles including acetonitrile and benzonitrile, amines including trimethylamine, triethylamine, tributylamine, N, N-dimethylaniline, pyridine, 2,2'-bipyridine and phenantholorine, and phosphines including triethylphosphine and triphenylphosphine; chain unsaturated hydrocarbons such as ethylene, butadiene, 1-pentene, isoprene, pentadiene, 1-hexene and derivatives thereof; unsaturated cyclic hydrocarbons such as benzene, toluene, xylene, cycloheptatriene, cyclooctadiene, cyclooctatriene, cyclooctatetraene and derivatives thereof. The bridges based on a covalent bond, A in the above Formula (III) include, for example, a methylene bridge, dimethylmethylene bridge, ethylene bridge, 1,1'-cyclohexylene bridge, dimethylsilylene bridge, dimethylgelmylene bridge and dimethylstannylene bridge.

More specifically, these compounds include the following compounds, and those having titanium or hafnium instead of zirconium.

Compounds of Formula (I):
(Pentamethylcyclopentadienyl)zirconium trimethyl,
(Pentamethylcyclopentadienyl)zirconium triphenyl,
(Pentamethylcyclopentadienyl)zirconium tribenzyl,
(Pentamethylcyclopentadienyl)zirconium trichloride,
(Pentamethylcyclopentadienyl)zirconium trimethoxide,
(Cyclopentadienyl)zirconium trimethyl,
(Cyclopentadienyl)zirconium triphenyl,
(Cyclopentadienyl)zirconium tribenzyl,
(Cyclopentadienyl)zirconium trichloride,
(Cyclopentadienyl)zirconium trimethoxide,
(Cyclopentadienyl)zirconium dimethylmethoxide,
(Methylcyclopentadienyl)zirconium trimethyl,
(Methylcyclopentadienyl)zirconium tripehnyl,
(Methylcyclopentadienyl)zirconium tribenzyl,
(Methylcyclopentadienyl)zirconium trichloride,
(Methylcyclopentadienyl)zirconium dimethylmethoxide,
(Dimethylcyclopentadienyl)zirconium trichloride,
(Trimethylcyclopentadienyl)zirconium trichloride,
(Trimethylsilylcyclopentadienyl)zirconium trimethyl,
(Tetramethylcyclopentadienyl)zirconium trichloride,
Compounds of Formula (II):
Bis(cyclopentadienyl)zirconium dimethyl,
Bis(cyclopentadienyl)zirconium diphenyl,
Bis(cyclopentadienyl)zirconium diethyl,
Bis(cyclopentadienyl)zirconium dibenzyl,
Bis(cyclopentadienyl)zirconium dimethoxide,
Bis(cyclopentadienyl)zirconium dichloride,
Bis(cyclopentadienyl)zirconium dihydride,
Bis(cyclopentadienyl)zirconium methoxide chloride,
Bis(cyclopentadienyl)zirconium chloride hydride,
Bis(methylcyclopentadienyl)dimethylzirconium,
Bis(methylcyclopentadienyl)zirconium dichloride,
Bis(methylcyclopentadienyl)zirconium dibenzyl,
Bis(pentamethylcyclopentadienyl)zirconium dimethyl,
Bis(pentamethylcyclopentadienyl)zirconium dichloride,
Bis(pentamethylcyclopentadienyl)zirconium dibenzyl,
Bis(pentamethylcyclopentadienyl)zirconium methylchloride,
Bis(pentamethylcyclopentadienyl)zirconium methylhydride,
(Cyclopentadienyl)(pentamethylcyclopentadienyl)zirconium dichloride.
Compounds of Formula (III):
Ethylenebis(indenyl)zirconium dimethyl,
Ethylenebis(indenyl)zirconium dichloride,
Ethylenebis(tetrahydroindenyl)zirconium dimethyl,
Ethylenebis(tetrahydroindenyl)zirconium dichloride,
Dimethylsilylenebis(cyclopentadienyl)zirconium dimethyl,
Dimethylsilylenebis(cyclopentadienyl)zirconium dichloride,
Isopropylidene(cyclopentadienyl)(9-fluorenyl)zirconium dimethyl,
Isopropylidene(cyclopentadienyl)(9-fluorenyl)zirconium dichloride,
[phenyl(methyl)methylene](9-fluorenyl)(cyclopentadienyl)zirconium dimethyl,
Diphenylmethylene(cyclopentadienyl)(9-fluorenyl)zirconium dimethyl, Ethylidene(9-fluorenyl)(cyclopentadienyl)zirconium dimethyl,
Cyclohyxylidene(9-fluorenyl)(cyclopentadienyl)zirconium dimethyl,
Cyclopentylidene(9-fluorenyl)(cyclopentadienyl)zirconium dimethyl,
Cyclobutylidene(9-fluorenyl)(cylcopentadienyl)zirconium dimethyl,
Dimethylsilylene(9-fluorenyl)(cyclopentadienyl)zirconium dimethyl,
Dimethylsilylenebis(2,3,5-trimethylcyclopentadienyl)zirconium dichloride,
Dimethylsilylenebis(2,3,5-trimethylcyclopentadienyl)zirconium dimethyl,
Dimethylsilylenebis(indenyl)zirconium dichloride.

Further, compounds other than the cyclopentadienyl compounds represented by Formula (I), (II) or (III) can be used. Examples of such compounds include the above-mentioned Compounds (IV), i.e., those transition metal compounds represented by Formula (IV):

$$M^1R^1{}_aR^2{}_bR^3{}_cR^4{}_d \qquad (IV)$$

Examples of the compounds represented by Formula (IV) are zirconium compounds, titanium compounds and hafnium compounds having at least one of a halogen atom, an alkyl group and an alkoxy group, such as tetramethylzirconium, tetrabenzylzirconium, tetramethoxyzirconium, tetraethoxyzirconium, tetrabutoxyzirconium, tetrachlorozirconium, tetrabromozirconium, butoxytrichlorozirconium, dibutoxydichlorozirconium, bis(2,5-di-t-butylphenoxy)dimethylzirconium, bis(2,5-di-t-butylphenoxy)dichlorozirconium and zirconium bis(acetylacetonate).

In the present invention, olefin based polymers can be effectively produced on an industrial scale without using a special compound if the compound represented by Formula (IV) is used as Compound (A').

Further, in the present invention, as Compound (A), a IVB Group transition metal compound having a ligand which is a multidentate ligand compound wherein two substituted or unsubstituted conjugated cycloalkadienyl groups (provided that at least one group is a substituted cycloalkadienyl group) are connected to each other through an element selected from the IVA Group of the Periodic Table, can be preferably used. Using this compound, isotactic polyolefins having high isotacticity, high molecular weight and high melting point can be produced.

Such compounds include, for example, those represented by the following Formula (V) or their derivatives.

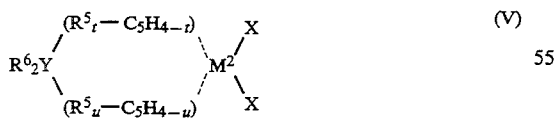

(V)

In Formula (V), Y is a carbon, silicon, germanium or tin atom; and $R^5{}_t$-$C_5H_{4-t}$ and $R^5{}_u$-$C_5H_{4-u}$ are independently a substituted cyclopentadienyl group; t and u are an integer of 1 to 4. $R^5$ is a hydrogen atom, silyl group or hydrocarbon group, and may be the same as or different from each other. Further, in at least one cyclopentadienyl ring, $R^5$ is connected to at least one carbon atom located next to a carbon atom connected to Y. $R^6$ is a hydrogen atom, $C_{1-20}$ alkyl group, $C_{6-20}$ aryl group, alkylaryl group or arylalkyl group. $M^2$ is a Ti, Zr or Hf atom. X is a hydrogen atom, halogen atom, $C_{1-20}$ alkyl group, $C_{6-20}$ aryl group, alkylaryl group, arylalkyl group or $C_{1-20}$ alkoxy group. X may be the same as or different from each other and two $R^6$ are the same as or different from each other.

In Formula (V), the substituted cyclopentadienyl groups include, for example, a methylcyclopentadienyl group, ethylcyclopentadienyl group, isopropylcyclopentadienyl group, 1,2-dimethylcyclopentadienyl group, 1,3-dimethylcyclopentadienyl group, 1,2,3-trimethylcyclopentadienyl group, 1,2,4-trimethylcyclopentadienyl group. Examples of X include halogen atoms such as a fluorine atom, chlorine atom, bromine atom and iodine atom; $C_{1-20}$ alkyl groups such as a methyl group, ethyl group, n-propyl group, isopropyl group, n-butyl group, octyl group and 2-ethylhexyl group; $C_{1-20}$ alkoxy groups such as a methoxy group, ethoxy group, propoxy group, butoxy group and phenoxy group; and $C_{6-20}$ aryl groups, alkylaryl groups or arylalkyl group, such as a phenyl group, tolyl group, xylyl group and benzyl group. Examples of $R^6$ are, for example, a methyl group, ethyl group, phenyl group, tolyl group, xylyl group or benzyl group.

These compounds (V) include, for example, the following compounds, and those having titanium or hafnium instead of zirconium.

Compounds (V):
Dimethylsilylenebis(2,3,5-trimethylcyclopentadienyl)zirconium dichloride,
Dimethylsilylenebis(2,3,5-trimethylcyclopentadienyl)hafnium dichloride.

Further, Compounds (B) are not particularly limited to, but include any compounds capable of forming an ionic complex when reacted with the transition metal compound (A). The suitable compounds as Compound (B) include a compound comprising a cation and anion wherein a plurality of covalently coordinated groups are connected to an element, that is, a compound comprising a cation containing an element selected from the groups of IIIB, VB, VIB, VIIB, VIII, IA, IB, IIA, IIB, IVA and VIIA of the Periodic Table and an anion wherein a plurality of covalently coordinated groups are connected to an element selected from the groups of VB, VIB, VIIB, VIII, IB, IIB, IIIA, IVA and VA of the Periodic Table, particularly a coordination complex compound comprising a cation and an anion wherein a plurality of covalently coordinated groups are connected to an element. The suitable compounds comprising a cation and an anion wherein a plurality of functional groups are connected to an element, include, for example, those represented by the following Formula (VI) or (VII):

$$([L^1\text{-}R^7]^{k+})_p([M^3Z^1Z^2\ldots Z^n]^{(n-m)-})_q \qquad (VI)$$

$$([L^2]^{k+})_p([M^4Z^1Z^2\ldots Z^n]^{(n-m)-})_q \qquad (VII)$$

wherein $L^2$ is $M^5$, $R^8R^9M^6$, $R^{10}{}_3C$ or $R^{11}M^6$.

In Formula (VI) or (VII), $L^1$ is a Lewis base; $M^3$ and $M^4$ are independently an element selected from the groups of VB, VIB, VIIB, VIII, IB, IIB, IIIA, IVA and VA, preferably IIIA, IVA and VA, of the Periodic Table; $M^5$ and $M^6$ are independently an element selected from the groups of IIIB, IVB, VB, VIB, VIIB, VIII, IA, IB, IIA, IIB and VIIA of the Periodic Table; $Z^1$ to $Z^n$ are independently a hydrogen atom, dialkylamino group, $C_{1-20}$ alkoxy group, $C_{6-20}$ aryloxy group, $C_{1-20}$ alkyl group, $C_{6-20}$ aryl group, alkylaryl group, arylalkyl group, $C_{1-20}$ halogenated hydrocarbon group, $C_{1-20}$ acyloxy group, organometalloid group or halogen atom; two or more of $Z^1$ to $Z^n$ may form a ring; $R^7$ is a hydrogen atom, $C_{1-20}$ alkyl group, $C_{6-20}$ aryl group, alkylaryl group or arylalkyl group; $R^8$ and $R^9$ are independently a cyclopentadienyl group, substituted cyclopentadienyl group, indenyl group or fluorenyl group; $R^{10}$ is a $C_{1-20}$ alkyl group, aryl group, alkylaryl group or arylalkyl group; $R^{11}$ is a large ring ligand such as tetraphenylporphyrin and phthalocyanine; m is a valency of $M^3$ and $M^4$ and is an integer of 1 to 7; n is an integer of 2 to 8; k is an ion value number of $[L^1\text{-}R^7]$ and $[L^2]$, and is an integer of 1 to 7; and p is an integer of at least 1; and q is specified by the formula: $q=(p\times k)/(n-m)$.

Examples of the above Lewis bases are amines such as ammonium, methylamine, aniline, dimethylamine, diethylamine, N-methylaniline, diphenylamine, trimethylamine, triethylamine, tri-n-butylamine, N,N-dimethylaniline, methyldiphenylamine, pyridine, p-bromo-N,N-dimethylaniline and p-nitro-N,N-dimethylaniline; phosphines such as triethylphosphine, triphenylphosphine and diphenylphosphine; ethers such as dimethyl ether, diethyl ether, tetrahydrofuran and dioxane; thioethers such as diethyl thioethers and tetrahydrothiophene; and esters such as ethylbenzoate. Examples of $M^3$ and $M^4$ are, for example, B, Al, Si, P, As and Sb, preferably B and P. Examples of $M^5$ are Li, Na, Ag, Cu, Br, I and $I_3$. Examples of $M^6$ are Mn, Fe, Co, Ni and Zn.

Examples of $Z^1$ to $Z^n$ include dialkylamino groups such as a dimethylamino group and diethylamino group; $C_{1-20}$ alkoxy groups such as a methoxy group, ethoxy group and n-butoxy group; $C_{6-20}$ aryloxy groups such as phenoxy group, 2,6-dimethylphenoxy group and naphthyloxy group; $C_{1-20}$ alkyl groups such as a methyl group, ethyl group, n-propyl group, iso-propyl group, n-butyl group, n-octyl group and 2-ethylhexyl group; $C_{6-20}$ aryl, alkylaryl or arylalkyl groups, such as a phenyl group, p-tolyl group, benzyl group, 4-t.-butylphenyl group, 2,6-dimethylphenyl group, 3,5-dimethylphenyl group, 2,4-dimethylphenyl group, 2,3-dimethylphenyl group; $C_{1-20}$ halogenated hydrocarbon groups such as p-fluorophenyl group, 3,5-difluorophenyl group, pentachlorophenyl group, 3,4,5-trifluorophenyl group, pentafluorophenyl group, 3,5-di(trifluoromethyl)phenyl group; halogen atoms such as F, $C_1$, Br and I; and organometalloid groups such as a pentamethylantimony group, trimethylsilyl group, trimethylgelmyl group, diphenylarsine group, dicyclohexylantimony group and diphenylboron group. Examples of $R^7$ and $R^{10}$ are the same as above. Examples of substituted cyclopentadienyl groups represented by $R^8$ and $R^9$ include those substituted with an alkyl group such as a methylcyclopentadienyl group, butylcyclopentadienyl group and pentamethylcyclopentadienyl group. Usually, the alkyl groups have 1 to 6 carbon atoms and the number of substituted alkyl groups is an integer of 1 to 5.

In Formula (VI) or (VII), $M^3$ and $M^4$ are preferably boron.

Of those compounds represented by Formula (VI) or (VII), the following compounds can be particularly used as preferred ones.

Compounds Represented by Formula (VI):
Triethylammonium tetraphenylborate, Tri(n-butyl)ammonium tetraphenylborate, Trimethylammonium tetraphenylborate,
Tetraethylammonium tetraphenylborate, Methyltri(n-butyl)ammonium tetraphenylborate, Benzyltri(n-butyl)ammonium tetraphenylborate,
Dimethyldiphenylammonium tetraphenylborate,
Methyltriphenylammonium tetraphenylborate,
Trimethylanilinium tetraphenylborate,
Methylpyridinium tetraphenylborate,
Benzylpyridinium tetraphenylborate,
Methyl(2-cyanopyridinium) tetraphenylborate,
Trimethylsulfonium tetraphenylborate,
Benzyldimethylsulfonium tetraphenylborate,
Triethylammonium tetrakis(pentafluorophenyl)borate,
Tri(n-butyl)ammonium tetrakis(pentafluorophenyl)borate,
Triphenylammonium tetrakis(pentafluorophenyl)borate,
Tetrabutylammonium tetrakis(pentafluorophenyl)borate,
Tetraethylammonium tetrakis(pentafluorophenyl)borate,
Methyltri(n-butyl)ammonium tetrakis(pentafluorophenyl)borate,
Benzyltri(n-butyl)ammonium tetrakis(pentafluorophenyl)borate,
Methyldiphenylammonium tetrakis(pentafluorophenyl)borate,
Methyltriphenylammonium tetrakis(pentafluorophenyl)borate,
Dimethyldiphenylammonium tetrakis(pentafluorophenyl)borate,
Anilinium tetrakis(pentafluorophenyl)borate, Methylanilinium tetrakis(pentafluorophenyl)borate,
Dimethylanilinium tetrakis(pentafluorophenyl)borate,
Trimethylanilinium tetrakis(pentafluorophenyl)borate,
Dimethyl(m-nitroanilinium) tetrakis(pentafluorophenyl)borate,
Dimethyl(p-bromoanilinium) tetrakis(pentafluorophenyl)borate,
Pyridinium tetrakis(pentafluorophenyl)borate, P-cyanopyridinium tetrakis(pentafluorophenyl)borate,
N-methylpyridinium tetrakis(pentafluorophenyl)borate,
N-benzylpyridinium tetrakis(pentafluorophenyl)borate,
O-cyano-N-mehtylpyridinium tetrakis(pentafluorophenyl)borate,
P-cyano-N-methylpyridinium tetrakis(pentafluorophenyl)borate,
P-cyano-N-benzylpyridinium tetrakis(pentafluorophenyl)borate,
Trimethylsulfonium tetrakis(pentafluorophenyl)borate,
Benzyldimethylsulfonium tetrakis(pentafluorophenyl)borate,
Tetraphenylphosphonium tetrakis(pentafluorophenyl)borate,
Triphenylphosphonium tetrakis(pentafluorophenyl)borate,
Dimethylanilinium tetrakis(3,5-ditrifluoromethylphenyl)borate,
and Hexafluoroarsenic acid triethylammonium.

Compounds Represented by Formula (VII):
Ferrocenium tetraphenylborate, Silver tetraphenyl borate, Trityl tetraphenylborate, Tetraphenylporphyrin manganese tetraphenylborate, Ferrocenium tetrakis(pentafluorophenyl)borate, 1,1'-Dimethylferrocenium tetrakis(pentafluorophenyl)borate, Decamethylferrocenium tetrakis(pentafluorophenyl)borate, Acetylferrocenium tetrakis(pentafluorophenyl)borate, Formylferrocenium tetrakis(pentafluorophenyl)borate, Cyanoferrocenium tetrakis(pentafluorophenyl)borate, Silver tetrakis(pentafluorophenyl)borate, Trityl tetrakis(pentafluorophenyl)borate, Lithium Tttrakis(pentafluorophenyl)borate, Sodium tetrakis(pentafluorophenyl)borate, Tetraphenylporphyrin manganese tetra(pentafluorophenyl)borate, Tetrakis(pentafluorophenyl)boric acid (tetraphenylporphyrin iron chloride), Tetrakis(pentafluorophenyl)boric acid (tetraphenylporphyrin zinc), Tetrafluorosilver borate, Hexafluoroarsenical silver and Hexafluorosilver antimonate.

In the compounds of Formulas (VI) and (VII), preferred are those represented by Formula (VI) wherein $[L^1\text{-}R^7]$ does not have a proton, i.e., quaternary ammonium salts, tertiary oxonium salts, tertiary thionium salts and the like. These are superior in long storage stability.

Further, compounds other than those represented by Formulas (VI) and (VII) can be used. Such compounds include tris(pentafluorophenyl)boron, tris(3,5-di(trifluoromethyl)phenyl)boron and tripheylboron.

In the present invention, Carriers (c) are not particularly limited to, but include inorganic carriers, inorganic oxide carriers and organic carriers. Of these, inorganic carriers and inorganic oxide carriers are particularly preferable.

More specifically, the inorganic carriers include magnesium compounds or their complex salts such as $MgCl_2$ and $Mg(OEt)_2$, and organic magnesium compounds such as $MgR^{13}_xX^1_y$. As used herein, $R^{13}$ is an alkyl group having 1 to 20 carbon atoms, an alkoxy group having 1 to 20 carbon atoms or an aryl group having 6 to 20 carbon atoms; $X^1$ is a halogen atom or an alkyl group having 1 to 20 carbon atoms; x is a number of 0 to 2; and y is a number of 0 to 2.

The inorganic oxide carriers include $SiO_2$, $Al_2O_3$, $MgO$, $ZrO_2$, $TiO_2$, $Fe_2O_3$, $B_2O_3$, $CaO$, $ZnO$, $BaO$, $ThO_2$ and mixtures thereof such as silica alumina, zeolite, ferrite and glass fibers. Of these, $SiO_2$ and $Al_2O_3$ are particularly preferable. In addition the above-mentioned inorganic oxide carriers may contain a small amount of carbonates, nitrates, sulfides or the like.

Further, the organic carriers include, for example, polymers such as polystyrene, polyethylene, polypropylene, substituted polystyrene and polyarylate, starches and carbon.

The suitable compounds as the carrier (C) which can be used in the present invention include $MgCl_2$, $Mg(OEt)_2$, $SiO_2$ and $Al_2O_3$.

The size of the carrier (C) is dependent upon its kind and its production process. The average particle size may usually range from 1 to 300 μm, preferably from 10 to 200 μm, more preferably from 20 to 100 μm.

If the average particle size is small, small particles in the resultant polymers will increase. If the average particle size is large, large particles in the resultant polymers will increase. This results in decrease in bulk density and clogging of a hopper.

Further, the specific surface area of Carrier (C) may be usually from 1 to 1,000 m²/g, preferably from 50 to 500 m²/g. The pore volume may be usually from 0.1 to 5 cm³/g, preferably from 0.3 to 3 cm³/g. If the specific surface area or the pore volume is outside of the above ranges, the catalyst activity may be decreased. In addition, the specific surface area and the pore volume can be, for example, measured from volume of nitrogen gas adsorbed in accordance with the BET method (Refer to "J. Am. Chem. Soc., Vol. 60, Page 309 (1983)").

Furthermore, the above-mentioned Carrier (C) is preferably used after being calcined at 150° to 1000° C., preferably at 200° to 800° C.

The olefin polymerization catalysts of the present invention are those comprising the above-mentioned Compound (A) and Compound (B) wherein Compound (A) and/or Compound (B), preferably Compounds (A) and (B) are carried on the above-mentioned Carrier (C).

Methods of having Compound (A) and/or Compound (B) carried on the above-mentioned Carrier (C) are not particularly limited to, but include the following methods (1) to (6).

(1) A method of mixing Compound (A) and/or Compound (B) with Carrier (C);
(2) A method of treating Carrier (C) with an organoaluminum compound or a halogen-containing silicon compound, and then mixing Compound (A) and/or Compound (B) with the treated Carrier (C) in an inert solvent;
(3) A method of reacting Carrier (C), Compounds (A) and/or Compound (B) and an organoaluminum compound or a halogen-containing silicon compound;
(4) A method of having Compound (A) or (B) carried on Carrier (C), and then mixing Compound (A) or (B) with the treated Carrier (C);
(5) A method of mixing a contact product of Compound (A) and Compound (B) with Carrier (C); and
(6) A method of reacting Compound (A) with Compound (B) in the presence of Carrier (C).

In addition, in the reaction of the above Method (4), (5) or (6), Organoaluminum compound (D) which will be described later can be added to the reaction system.

The catalysts obtained as above can be used as it is for polymerization without any treatment or can be used as a solid after removing the solvent.

Further, in the present invention, the catalyst can be prepared by having Compound (A) and/or Compound (B) on Carrier (C) in the polymerization system. In such method, for example, an autoclave is charged with an inert solvent, Compound (A) and/or Compound (B) and, as required, Compound (D) described later. Then, pre-polymerization is carried out at −20° C. to 100° C. for 1 minute to 2 hours while an olefin such as ethylene is introduced to keep a pressure of from normal pressure to 20 Kg/cm², to prepare catalysts particles.

In the present invention, a mixing ratio (weight ratio) of Compound (B) to Carrier (C) may preferably be from 1:5 to 1:10,000, more preferably from 1:10 to 1:500. Further, a mixing ratio (weight ratio) of Compound (A) to Carrier (C) may preferably be from 1:5 to 1:10,000, more preferably from 1:10 to 1:500. If the mixing ratio of Compound (B) to Carrier (C) or the mixing ratio of Compound (A) to Carrier (C) is outside of the above ranges, the activity may be decreased.

The olefin polymerization catalysts of the present invention, prepared as above, may have an average particle size of usually from 2 to 200 μm, preferably from 10 to 150 μm, more preferably from 20 to 100 μm; and a specific surface area of usually from 20 to 1,000 m²/g, preferably from 50 to 500 m²/g. If the average particle size is less than 2 μm, small particles in the resultant polymers may increase. If the average particle size is more than 200 μm, large particles in the resultant polymers may increase. If the specific surface area is less than 20 m²/g, the activity may be decreased. If the specific surface are is more than 1000 m²/g, the bulk density of the resultant polymers may be decreased.

Further, in the catalysts of the present invention, the amount of the transition metal contained in 100 g of the carrier may usually be from 0.05 to 10 g, preferably from 0.1 to 2 g. If the amount of the transition metal is outside of the above ranges, the activity may be decreased.

The olefin polymerization of the present invention is characterized by carrying out homopolymerization of an olefin or copolymerization of two or more of olefins in the presence of the above-mentioned olefin polymerization catalyst.

In this case, the kind of olefins are not particularly limited. But, alpha-olefins having 2 to 20 carbon atoms are preferable. More specifically, suitable alpha-olefins include, for example, ethylene, propylene, 1-butene, 3-methyl-1-butene, 1-hexene, 4-methyl-1-pentene, 1-octene, 1-decene, 1-dodecene, 1-pentene, 1-tetradecene, 1-hexadecene, 1-octadecene and 1-eicosene.

In the present invention, when two or more of alpha-olefins are copolymerized, any combination of the above monomers can be used. In the case of copolymerizing ethylene and an alpha-olefin having 3 to 10 carbon atoms, a molar ratio of ethylene to the other alpha-olefins may be usually 99.9:0.1 to 60.0:40.0, preferably 99.5:0.5 to 75.0:25.0.

In the present invention, in addition to the above alpha-olefins, it is possible to copolymerize the other unsaturated compounds such as vinyl aromatic compounds such as styrene, p-methylstyrene, p-isopropylstyrene and p-t-butylstyrene, chain diolefins such as butadiene, isoprene and 1,5-hexadiene, cyclic olefins such as norbornene and 1,4,5,8-dimethano-1,2,3,4,4a,5,8,8a-octahydronaphthalene and cyclic diolefins such as norbornadiene and ethylidene norbornene. In general, the other unsaturated compounds are used in an amount of 20 mole percent based on the amount of the alpha-olefin used. In this case, at least one alpha-olefin is preferably used.

Polymerization methods are not particularly limited to, but include slurry polymerization, gas phase polymerization, bulk polymerization, solution polymerization and suspension polymerization. Slurry polymerization and gas phase polymerization are particularly preferred.

As for polymerization conditions, the polymerization temperature may range from −100° to 250° C., preferably from −50° to 200° C., more preferably from 0° to 130° C. Further, the catalyst is preferably used in an amount to provide a starting monomer/Component (A) molar ratio or a starting monomer/Component (B) molar ratio of from 1 to $10^8$, preferably from 100 to $10^5$. The polymerization time may usually range from 5 minutes to 10 hours. The reaction pressure may range from normal pressure to 100 Kg/cm²G, preferably from normal pressure to 30 Kg/cm²G.

The molecular weight of the resultant polymer can be controlled by appropriately selecting the amount of each catalyst component and polymerization temperature, or by a polymerization reaction in the presence of hydrogen.

In the case of using polymerization solvents, suitable solvents include aromatic hydrocarbons such as benzene, toluene, xylene and ethylbenzene; alicyclic hydrocarbons such as cyclopentane, cyclohexane and methylcyclohexane; aliphatic hydrocarbons such as pentane, hexane, heptane and octane; and halogenated hydrocarbons such as chloroform and dichloromethane. These solvents can be used alone or in combination. Monomers such as alpha-olefins can also be used as solvent. In addition, the polymerization can be carried out in the absence of a solvent.

In the polymerization process of the present invention, pre-polymerization can be carried out in the presence of the catalyst according to the present invention.

The pre-polymerization can be carried out by any known methods such as a method of bringing a small amount of olefins into contact with the solid catalyst components.

The olefins which can be used in the pre-polymerization are not particularly limited to, but include those olefins mentioned before such as $C_{3-20}$ alpha-olefins or mixtures thereof. It is preferable to use, for the pre-polymerization, the same olefin used in the subsequent polymerization.

Further, the pre-polymerization temperature may usually range from −20° to 100° C., preferably from −10° to 70° C., more preferably from 0° to 50° C.

In the pre-polymerization, inert hydrocarbons, aliphatic hydrocarbons, aromatic hydrocarbons, monomers or the like, can be used as a solvent. Of these, aliphatic hydrocarbons are particularly preferable. In addition, the pre-polymerization can be carried out in the absence of a solvent.

In the pre-polymerization, it is preferable to adjust conditions so that the intrinsic viscosity of the pre-polymer (measured at 135° C. in decalin) ranges at least 0.2 dl/g, preferably at least 0.5 dl/g, and that the yield of the pre-polymer ranges from 1 to 10,000 g, preferably from 10 to 1,000 g per 1 millimoles of the transition metal component in the catalyst used.

In the olefin polymerization of the present invention, homopolymerization of an olefin or copolymerization of olefins can be carried out using an organoaluminum compound (D) together with the above-mentioned polymerization catalyst. The use of such Compound (D) results in improvement of polymerization activity.

Organoaluminum compounds as Component (D) include those represented by the following Formula (VIII), (IX) or (X):

$$R^{14}{}_rAlQ_{3-r} \qquad \text{(VIII)}$$

wherein $R^{14}$ is a hydrocarbon group such as an alkyl group, alkenyl group, aryl group or arylalkyl group, having 1 to 20, preferably 1 to 12 carbon atoms; Q is a hydrogen atom, a $C_{1-20}$ alkoxy group or a halogen atom; and r is a number between 1 and 3.

Examples of compounds represented by Formula (VIII) are, for example, trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydroide, diethylaluminum hydride and ethylaluminumsesquichloride.

Linear aluminoxanes represented by the following Formula (IX):

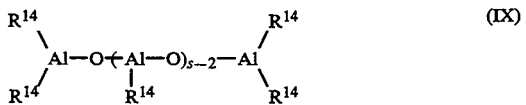

wherein $R^{14}$ is as defined in Formula (VIII); and s is a degree of polymerization, usually from 3 to 50, preferably 7 to 40.

Cyclic alkylaluminoxanes having a repeating unit represented by the formula:

wherein $R^{14}$ is defined in Formula (VIII); and s is a degree of polymerization, usually from 3 to 50, preferably 7 to 40.

Of these compounds represented by Formulas (VIII) to (X), preferable compounds are an aluminum compound containing at least one alkyl group having at least three carbon atoms, particularly a branched alkyl group and aluminoxanes. Particularly preferred are triisobutylaluminum and aluminoxanes with a polymerization degree of at least 7. Use of triisobutylaluminum, aluminoxane with polymerization degree of at least 7 or a mixture thereof gives high activity.

Methods of preparing the above aluminoxanes are not particularly limited to, but include any known methods such as a process comprising contacting alkylaluminum with a condensation agent such as water. Alkylaluminum and a condensation agent can be reacted by known methods, for example, (1) a method comprising dissolving an organoaluminum compound in an organic solvent, and contacting the solution with water; (2) a method comprising adding an organoaluminum compound to starting materials for polymerization, and adding water to the reaction mixture later; (3) a method comprising reacting an organoaluminum compound with crystalline water contained in a metal salt and the like or water adsorbed to an inorganic material or an organic material; (4) a method comprising reacting tetraalkyldialuminoxane with trialkylaluminum, and then reacting the reaction product with water.

Further, the amount of Component (D) used may be from 1 to 2,000 moles, preferably from 5 to 1,000 moles, most preferably from 10 to 500 moles, per 1 mole of Component (A). The use of Component (D) may improve polymerization activity. However, the use of excess amount of Component (D) is not desirable since the organoaluminum compound will be in vain and a great amount of the organoaluminum compound will remain in the resultant polymer.

In addition, Component (D) may be contacted with the catalyst of the present invention for use in polymerization. The contact of Component (D) and the catalyst can be effected before the polymerization or during the polymerization.

According to the present invention, an olefin homopolymer or a copolymer of olefins having excellent properties such as high bulk density and narrow molecular weight distribution, can be effectively produced without using a great amount of an organometallic compound.

EXAMPLES AND COMPARATIVE EXAMPLES

The present invention will be described in more detail with reference to the following Examples and Comparative Examples, which are not used to limit the present invention.

In the following Examples and Comparative Examples, physical properties were measured as follows.
Intrinsic Viscosity [η]

The intrinsic viscosity was measured in decalin at 135° C.
Bulk Density
The bulk density was measured in accordance with JIS K6721.

EXAMPLE 2

A 200 ml flask purged with nitrogen was charged with 2.3 g of silica (average particle size: 70 μm; specific surface area: 260 m²/g; pore volume: 1.5 cc/g) which was calcined at 300° C. for 4 hours, 100 ml (milliliter) of a toluene solution of bis(cyclopentadienyl)zirconium dichloride (0.01 mole/l), 5 mmol (millimoles) of triisobutylalumminum (TIBA) and 2 mmol of dimethylanilinium tetrakis(pentafluorophenyl)borate. The mixture was stirred at room temperature for 30 minutes. Then, toluene was removed under reduced pressure to obtain a solid catalyst.

Thereafter, an autoclave was charged with 400 ml of toluene, 0.6 mmol of TIBA and 0.003 mmol (calculated based on zirconium) of the solid catalyst as obtained above. Then, the polymerization was carried out at 90° C. for 30 minutes while ethylene was continuously supplied to the autoclave to keep a pressure of 9 Kg/cm². As a result, 104 g of a polymer were obtained.

The obtained polymer had an intrinsic viscosity of 2.13 dl/g. Further, the polymer had a bulk density of 0.36 g/cm³ and good particle size distribution, and was in the spherical shape.

EXAMPLE 2

The procedures of Example 1 were repeated except that bis(cyclopentadienyl)zirconium dimethyl was used instead of bis(cyclopentadienyl)zirconium dichloride; and triisobutylaluminum (TIBA) was not used, to prepare a solid catalyst. Thereafter, the polymerization was carried out in the same manner as in Example 1.

As a result, 101 g of a spherical polymer were obtained. The obtained polymer had an intrinsic viscosity of 2.09 dl/g, a bulk density of 0.34 g/cm³ and good particle size distribution.

EXAMPLE 3

The procedures of Example 1 were repeated except that ferrocenium tetrakis(pentafluorophenyl)borate was used instead of dimethylanilinium tetrakis(pentafluorophenyl)borate; and triisobutylaluminum (TIBA) was not used, to prepare a solid catalyst. Thereafter, the polymerization was carried out in the same manner as in Example 1.

As a result, 120 g of a spherical polymer having an intrinsic viscosity of 2.02 dl/g, a bulk density of 0.35 g/cm³ and good particle size distribution were obtained.

EXAMPLES 4 TO 29

The procedures of Example 1 were prepared except that the compounds as shown in Table 1 or Table 2 are used as Compounds (A), (B) or (C), to prepare a solid catalyst. Thereafter, the polymerization was carried out in the same manner as in Example 1. The results are as shown in Table 4 or Table 5.

From the results as shown in Table 4 and Table 5, it was confirmed that according to the present invention spherical polymers having high bulk density can be produced.

EXAMPLE 30

Three (3) g of anhydrous magnesium chloride dried in vacuo, 1 mmol of bis(cyclopentadienyl)zirconium dichloride contained in toluene (100 ml), 5 mmol of triisobutylaluminum (TIBA) and 2 mmol of dimethylanilinum tetrakis(pentafluorophenyl)borate, were subjected to wet-cogrinding treatment with a ball mil for 6 hours. The obtained products were washed with toluene to obtain a solid catalyst.

The polymerization was carried out in the same manner as in Example 1 except that the solid catalyst using the above anhydrous magnesium chloride as a carrier, was used instead of the solid catalyst using silica as a carrier. The results are as shown in Table 5.

EXAMPLE 31

The polymerization was carried out in the same manner as in Example 30 except that 3 g of alumina were used instead of anhydrous magnesium chloride as a carrier. The results are as shown in Table 5.

EXAMPLE 32

The polymerization was carried out in the same manner as in Example 31 except that bis(cyclopentadienyl)zirconium methoxychloride was used instead of bis(cyclopentadienyl)zirconium dichloride. The results are as shown in Table 5.

EXAMPLES 33-50

The procedures of Example 30 were carried out except that the compounds as shown in Table 3 are used as Compound (A), (B) or (C) to prepare a solid catalyst.

Thereafter, the polymerization was carried out as shown in Table 6 in the same manner as in Example 30. The results are as shown in Table 6.

EXAMPLE 51

By using the solid catalyst prepared in Example 2 the gas phase copolymerization of ethylene and 1-butene was carried out.

In a 4.5-liter stainless steel autoclave equipped with a stirrer (anchor-type wing), were placed 30 g of ethylene.1-butene copolymer powder and were dried under vacuum-heat condition at 90° C. Keeping the temperature as it was, the pressure was recovered to atomspheric pressure with charge of nitrogen. Further 2.0 Kg/cm$^2$ of 1-butene and 10.0 Kg/cm$^2$ of ethylene were added to the autoclave so that 12.0 Kg/cm$^2$ of total pressure is obtained. Thereafter 1.0 mmol of triisobutyl aluminum and 0.006 mmol in terms of Zirconium atom of the solid catalyst prepared in Example 2 were added to 30 ml of dry heptane and immediately the mixture was put into the reactor so as to start the reaction.

Keeping the reaction temperature and the pressur as they were, ethylene was provided continuously.

After the reaction for one hour the pressure was reduced and 260 g of copolymer were obtained.

The bulk density of the copolymer was 0.35 g/cm$^3$.

EXAMPLE 52

The procedures of Example 51 were repeated except that bis(cyclopentadienyl)zirconium dimethoxide was used instead of bis(cyclopentadienyl)zirconium dimethyl to prepare a solid catalyst. Thereafter, the polymerization was carried out in the same manner as in Example 51.

As a result, 158 g of a spherical polymer having a bulk density of 0.37 g/cm$^3$ were obtained.

EXAMPLE 53

The procedures of Example 51 were repeated except that zirconium tetrachloride was used instead of bis(cyclopentadienyl)zirconium dichloride to prepare a solid catalyst.

Thereafter, the polymerization was carried out in the same manner as in Example 51.

As a result a spherical polymer having a bulk density of 0.35 g/cm$^3$ was obtained.

COMPARATIVE EXAMPLE 1

The catalyst preparation and the polymerization were carried out in the same manner as in Example 1 except that silica as a carrier was not used.

The obtained polymer had low bulk density, was in the shape of cotton and thus showed poor properties.

TABLE 1

| | Compound (A) | Compound (B) | Compound (C) | Compound (D) |
|---|---|---|---|---|
| Example 1 | Cp$_2$ZrCl$_2$ | [PhNMe$_2$H][B(C$_6$F$_5$)$_4$] | Silica | TIBA |
| Example 2 | Cp$_2$ZrMe$_2$ | [PhNMe$_2$H][B(C$_6$F$_5$)$_4$] | Silica | — |
| Example 3 | Cp$_2$ZrCl$_2$ | [Fc][B(C$_6$F$_5$)$_4$] | Silica | — |
| Example 4 | Cp$_2$ZrCl$_2$ | [NMe2CNPy][B(C$_6$F$_5$)$_4$] | Silica | — |
| Example 5 | Cp$_2$ZrCl$_2$ | [Fc'][B(C$_6$F$_5$)$_4$] | Silica | — |
| Example 6 | Cp$_2$ZrCl$_2$ | [Ph$_3$C][B(C$_6$F$_5$)$_4$] | Silica | — |
| Example 7 | Cp$_2$ZrHCl | [Fc][B(C$_6$F$_5$)$_4$] | Silica | — |
| Example 8 | Cp$_2$ZrMe$_2$ | [Fc][B(C$_6$F$_5$)$_4$] | Silica | — |
| Example 9 | Cp$_2$ZrMe$_2$ | [Fc][B(C$_6$F$_5$)$_4$] | Silica | — |
| Example 10 | CpZrMe$_3$ | [Fc][B(C$_6$F$_5$)$_4$] | Silica | — |
| Example 11 | CpZrMe$_3$ | [Fc][B(C$_6$F$_5$)$_4$] | Silica | — |
| Example 12 | CpZrMeCl$_2$ | [Fc][B(C$_6$F$_5$)$_4$] | Silica | — |
| Example 13 | CpZrCl$_3$ | [PhNMe$_2$H][B(C$_6$F$_5$)$_4$] | Silica | — |
| Example 14 | CpZrCl$_3$ | [Fc][B(C$_6$F$_5$)$_4$] | Silica | — |
| Example 15 | ZrB$_{z4}$ | [PhNMe$_2$H][B(C$_6$F$_5$)$_4$] | Silica | — |
| Example 16 | ZrB$_{z4}$ | [Fc][B(C$_6$F$_5$)$_4$] | Silica | — |

[Fc]: Ferrocenium ion
[Fc']: 1,1'-dimethylferrocenium ion
[NMe2CNPy]: N-methyl-(2-cyanopyridinium) ion
B$_z$: Benzyl group
Me: Methyl group
EBI: Ethylenebis(1-indenyl) group
IPCF: Isopropylidene(cyclopentadienyl-9-fluorenyl) group
TIBA: Triisobutylaluminum

TABLE 2

|  | Compound (A) | Compound (B) | Compound (C) | Compound (D) |
|---|---|---|---|---|
| Example 17 | $ZrB_{z4}$ | $[PhNMe_2H][B(C_6F_5)_4]$ | Silica | — |
| Example 18 | $ZrB_{z4}$ | $[Fc][B(C_6F_5)_4]$ | Silica | — |
| Example 19 | $ZrCl_4$ | $[PhNMe_2H][B(C_6F_5)_4]$ | Silica | — |
| Example 20 | $ZrCl_4$ | $[Fc][B(C_6F_5)_4]$ | Silica | — |
| Example 21 | $Cp_2ZrHCl$ | $[PhNMe_2H][B(C_6F_5)_4]$ | Silica | — |
| Example 22 | $CpZrMe_3$ | $[PhNMe_2H][B(C_6F_5)_4]$ | Silica | — |
| Example 23 | $CpZrMeCl_2$ | $[PhNMe_2H][B(C_6F_5)_4]$ | Silica | — |
| Example 24 | $Cp_2ZrMe_2$ | $[PhNMe_2H][B(C_6F_5)_4]$ | Silica | — |
| Example 25 | $CpZrMe_3$ | $[PhNMe_2H][B(C_6F_5)_4]$ | Silica | — |
| Example 26 | $EBIZrCl_2$ | $[PhNMe_2H][B(C_6F_5)_4]$ | Silica | — |
| Example 27 | $EBIZrCl_2$ | $[Fc][B(C_6F_5)_4]$ | Silica | — |
| Example 28 | $IPCFZrCl_2$ | $[PhNMe_2H][B(C_6F_5)_4]$ | Silica | — |
| Example 29 | $IPCFZrCl_2$ | $[Fc][B(C_6F_5)_4]$ | Silica | — |
| Example 30 | $Cp_2ZrCl_2$ | $[PhNMe_2H][B(C_6F_5)_4]$ | $MgCl_2$ | TIBA |
| Example 31 | $Cp_2ZrCl_2$ | $[PhNMe_2H][B(C_6F_5)_4]$ | Alumina | TIBA |
| Example 32 | $Cp_2ZrClOCH_3$ | $[PhNMe_2H][B(C_6F_5)_4]$ | $MgCl_2$ | TIBA |

[Fc]: Ferrocenium ion
$B_z$: Benzyl group
Me: Methyl group
EBI: Ethylenebis(1-indenyl) group
IPCF: Isopropylidene(cyclopentadienyl-9-fluorenyl) group
TIBA: Triisobutylaluminum

TABLE 3

|  | Compound (A) | Compound (B) | Compound (C) | Compound (D) |
|---|---|---|---|---|
| Example 33 | $Cp_2Zr(OMe)_2$ | $[PhNMe_2H][B(C_6F_5)_4]$ | $MgCl_2$ | — |
| Example 34 | $Cp_2Zr(OMe)_2$ | $[Fc][B(C_6F_5)_4]$ | $MgCl_2$ | — |
| Example 35 | $Cp_2Zr(OMe)_2$ | $[PhNMe_2H][B(C_6F_5)_4]$ | Alumima | — |
| Example 36 | $Cp_2Zr(OMe)_2$ | $[PhNMe_2H][B(C_6F_5)_4]$ | $MgCl_2$ | — |
| Example 37 | $Cp_2Zr(OMe)_2$ | $[PhNMe_2H][B(C_6F_5)_4]$ | $MgCl_2$ | — |
| Example 38 | $Cp_2Zr(OMe)_2$ | $[PhNMe_2H][B(C_6F_5)_4]$ | $MgCl_2$ | — |
| Example 39 | $Cp_2TiCl_2$ | $[PhNMe_2H][B(C_6F_5)_4]$ | $MgCl_2$ | — |
| Example 40 | $Cp_2Ti(OMe)_2$ | $[PhNMe_2H][B(C_6F_5)_4]$ | $MgCl_2$ | — |
| Example 41 | $Cp_2HfCl_2$ | $[PhNMe_2H][B(C_6F_5)_4]$ | $MgCl_2$ | — |
| Example 42 | $Cp_2Hf(OMe)_2$ | $[PhNMe_2H][B(C_6F_5)_4]$ | $MgCl_2$ | — |
| Example 43 | $CpZrCl_3$ | $[PhNMe_2H][B(C_6F_5)_4]$ | $MgCl_2$ | — |
| Example 44 | $CpZrCl_3$ | $[PhNMe_2H][B(C_6F_5)_4]$ | Alumina | — |
| Example 45 | $ZrCl_4$ | $[PhNMe_2H][B(C_6F_5)_4]$ | $MgCl_2$ | — |
| Example 46 | $ZrCl_4$ | $[PhNMe_2H][B(C_6F_5)_4]$ | Alumina | — |
| Example 47 | $CpZrCl_3$ | $[PhNMe_2H][B(C_6F_5)_4]$ | $Mg(OC_2H_2)_2$ | — |
| Example 48 | $ZrCl_4$ | $[PhNMe_2H][B(C_6F_5)_4]$ | $Mg(OC_2H_2)_2$ | — |
| Example 49 | $Cp_2ZrCl_2$ | $[PhNMe_2H][B(C_6F_5)_4]$ | $Mg(OC_2H_2)_2$ | — |
| Example 50 | $Cp_2Zr(OCH_3)$ | $[PhNMe_2H][B(C_6F_5)_4]$ | $Mg(OC_2H_2)_2$ | — |

[Fc]: Ferrocenium ion
$B_z$: Benzyl group
Me: Methyl group
EBI: Ethylenebis(1-indenyl) group
IPCF: Isopropylidene(cyclopentadienyl-9-fluorenyl) group
TIBA: Triisobutylaluminum

TABLE 4

|  | Amount of Catalyst Used mmol Based on metal | Compound (D) Kind | Compound (D) Amount (mmol) | Monomer Kind | Pressure Supplied (Kg/cm$^2$) | Polymerization Conditions Temp. (°C.) | Polymerization Conditions Time (hr) | Amount of Polymer Recoverd (g) | $[\eta]$ (dl/g) | Bulk Density (g/cm$^3$) | Shape of Polymer |
|---|---|---|---|---|---|---|---|---|---|---|---|
| Example 1 | 0.003 | TIBA | 0.6 | Ethylene | 9 | 90 | ½ | 104 | 2.13 | 0.36 | ○ |
| Example 2 | 0.003 | TIBA | 0.6 | Ethylene | 9 | 90 | ½ | 101 | 2.09 | 0.34 | ○ |
| Example 3 | 0.003 | TIBA | 0.6 | Ethylene | 9 | 90 | ½ | 120 | 2.02 | 0.35 | ○ |
| Example 4 | 0.003 | TIBA | 0.6 | Ethylene | 9 | 90 | ½ | 69 | 2.11 | 0.34 | ○ |
| Example 5 | 0.003 | TIBA | 0.6 | Ethylene | 9 | 90 | ½ | 102 | 2.06 | 0.35 | ○ |
| Example 6 | 0.003 | TIBA | 0.6 | Ethylene | 9 | 90 | ½ | 45 | 1.99 | 0.33 | ○ |
| Example 7 | 0.003 | TIBA | 0.6 | Ethylene | 9 | 90 | ½ | 106 | 2.03 | 0.34 | ○ |
| Example 8 | 0.003 | TIBA | 0.6 | Ethylene | 9 | 90 | ½ | 124 | 2.05 | 0.32 | ○ |
| Example 9 | 0.003 | — | — | Ethylene | 9 | 90 | ½ | 18 | 1.89 | 0.32 | ○ |
| Example 10 | 0.003 | TIBA | 0.6 | Ethylene | 9 | 90 | ½ | 118 | 2.15 | 0.33 | ○ |
| Example 11 | 0.003 | — | — | Ethylene | 9 | 90 | ½ | 20 | 2.00 | 0.31 | ○ |
| Example 12 | 0.003 | TIBA | 0.6 | Ethylene | 9 | 90 | ½ | 109 | 2.13 | 0.33 | ○ |
| Example 13 | 0.003 | TIBA | 0.6 | Ethylene | 9 | 90 | ½ | 98 | 2.01 | 0.34 | ○ |
| Example 14 | 0.003 | TIBA | 0.6 | Ethylene | 9 | 90 | ½ | 100 | 2.15 | 0.32 | ○ |
| Example 15 | 0.003 | TIBA | 0.6 | Ethylene | 9 | 90 | ½ | 111 | 2.21 | 0.35 | ○ |
| Example 16 | 0.003 | TIBA | 0.6 | Ethylene | 9 | 90 | ½ | 104 | 2.01 | 0.34 | ○ |

Shape of Polymer ○: Spherical, Good Particle Size Distribution

TABLE 5

| | Amount of Catalyst Used mmol Based on metal | Compound (D) Kind | Compound (D) Amount (mmol) | Monomer Kind | Monomer Pressure Supplied (Kg/cm²) | Polymerization Conditions Temp. (°C.) | Polymerization Conditions Time (hr) | Amount of Polymer Recoverd (g) | Physical Properties of Polymer [η] (dl/g) | Physical Properties of Polymer Bulk Density (g/cm³) | Shape of Polymer |
|---|---|---|---|---|---|---|---|---|---|---|---|
| Example 17 | 0.3 | — | — | Ethylene | 9 | 90 | ½ | 19 | 1.92 | 0.31 | ○ |
| Example 18 | 0.3 | — | — | Ethylene | 9 | 90 | ½ | 17 | 1.97 | 0.30 | ○ |
| Example 19 | 0.3 | TIBA | 0.6 | Ethylene | 9 | 90 | ½ | 98 | 2.16 | 0.34 | ○ |
| Example 20 | 0.3 | TIBA | 0.6 | Ethylene | 9 | 90 | ½ | 114 | 2.14 | 0.33 | ○ |
| Example 21 | 0.003 | TIBA | 0.6 | Ethylene | 9 | 90 | ½ | 102 | 2.13 | 0.34 | ○ |
| Example 22 | 0.003 | TIBA | 0.6 | Ethylene | 9 | 90 | ½ | 103 | 2.05 | 0.35 | ○ |
| Example 23 | 0.003 | TIBA | 0.6 | Ethylene | 9 | 90 | ½ | 96 | 2.04 | 0.34 | ○ |
| Example 24 | 0.003 | — | — | Ethylene | 9 | 90 | ½ | 21 | 1.89 | 0.32 | ○ |
| Example 25 | 0.003 | — | — | Ethylene | 9 | 90 | ½ | 16 | 1.95 | 0.31 | ○ |
| Example 26 | 0.01 | TIBA | 0.6 | Propylene | 7 | 30 | 1 | 16 | 2.15 | 0.30 | ○ |
| Example 27 | 0.01 | TIBA | 0.6 | Propylene | 7 | 30 | 1 | 20 | 2.04 | 0.29 | ○ |
| Example 28 | 0.01 | TIBA | 0.6 | Propylene | 7 | 30 | 1 | 10 | 1.41 | 0.30 | ○ |
| Example 29 | 0.01 | TIBA | 0.6 | Propylene | 7 | 30 | 1 | 15 | 1.40 | 0.30 | ○ |
| Example 30 | 0.003 | TIBA | 0.6 | Ethylene | 9 | 90 | ½ | 96 | 2.11 | 0.31 | ○ |
| Example 31 | 0.003 | TIBA | 0.6 | Ethylene | 9 | 90 | ½ | 89 | 2.08 | 0.30 | ○ |
| Example 32 | 0.01 | TIBA | 0.6 | Ethylene | 9 | 90 | ½ | 82 | 2.04 | 0.30 | ○ |

TABLE 6

| | Amount of Catalyst Used mmol Based on metal | Compound (D) Kind | Compound (D) Amount (mmol) | Monomer Kind | Monomer Pressure Supplied (Kg/cm²) | Polymerization Conditions Temp. (°C.) | Polymerization Conditions Time (hr) | Amount of Polymer Recoverd (g) | Physical Properties of Polymer [η] (dl/g) | Physical Properties of Polymer Bulk Density (g/cm³) | Shape of Polymer |
|---|---|---|---|---|---|---|---|---|---|---|---|
| Example 33 | 0.003 | TIBA | 0.6 | Ethylene | 9 | 90 | ½ | 91 | 2.12 | 0.31 | ○ |
| Example 34 | 0.003 | TIBA | 0.6 | Ethylene | 9 | 90 | ½ | 102 | 2.10 | 0.31 | ○ |
| Example 35 | 0.003 | TIBA | 0.6 | Ethylene | 9 | 90 | ½ | 95 | 2.09 | 0.30 | ○ |
| Example 36 | 0.003 | TIBA | 0.3 | Ethylene | 9 | 90 | ½ | 86 | 2.10 | 0.31 | ○ |
| Example 37 | 0.003 | TIBA | 0.15 | Ethylene | 9 | 90 | ½ | 80 | 2.10 | 0.30 | ○ |
| Example 38 | 0.003 | TIBA | 0.6 | Ethylene 1-Octene | 9 31 ml | 90 | ½ | 89 | 1.90 | 0.30 | ○ |
| Example 39 | 0.003 | TIBA | 0.6 | Ethylene | 9 | 90 | ½ | 15 | 2.65 | 0.32 | ○ |
| Example 40 | 0.003 | TIBA | 0.6 | Ethylene | 9 | 90 | ½ | 13 | 2.81 | 0.31 | ○ |
| Example 41 | 0.003 | TIBA | 0.6 | Ethylene | 9 | 90 | ½ | 79 | 2.20 | 0.30 | ○ |
| Example 42 | 0.003 | TIBA | 0.6 | Ethylene | 9 | 90 | ½ | 81 | 2.19 | 0.30 | ○ |
| Example 43 | 0.003 | TIBA | 0.6 | Ethylene 1-Octene | 9 31 ml | 90 | 1 | 86 | 1.91 | 0.31 | ○ |
| Example 44 | 0.003 | TIBA | 0.6 | Ethylene 1-Octene | 9 31 ml | 90 | 1 | 91 | 1.90 | 0.32 | ○ |
| Example 45 | 0.03 | TIBA | 0.6 | Ethylene 1-Octene | 9 31 ml | 90 | 2 | 47 | 1.88 | 0.30 | ○ |
| Example 46 | 0.03 | TIBA | 0.6 | Ethylene 1-Octene | 9 31 ml | 90 | 2 | 46 | 1.87 | 0.30 | ○ |
| Example 47 | 0.003 | TIBA | 0.6 | Ethylene 1-Octene | 9 31 ml | 90 | ½ | 85 | 1.90 | 0.30 | ○ |
| Example 48 | 0.03 | TIBA | 0.6 | Ethylene 1-Octene | 9 31 ml | 90 | ½ | 41 | 1.88 | 0.30 | ○ |
| Example 49 | 0.003 | TIBA | 0.6 | Ethylene 1-Octene | 9 31 ml | 90 | ½ | 96 | 1.91 | 0.31 | ○ |
| Example 50 | 0.003 | TIBA | 0.6 | Ethylene 1-Octene | 9 31 ml | 90 | ½ | 89 | 1.91 | 0.31 | ○ |

Shape of Polymer ○: Spherical, Good Particle Size Distribution
1-Octene content of Example 38 and 43 ~ 50 was 3 mol %

What is claimed is:

1. A process for polymerizing an olefin, which comprises contacting an olefin with a catalyst, wherein said catalyst comprises:

(A) a transition metal compound containing a transition metal selected from Group IVB of the periodic table; and (B) a compound, wherein compounds (A) and (B) are carried on a carrier (C); and (D) an organoaluminum compound of formula (VIII):

$$R^{14}{}_r AlQ_{3-r} \qquad (VIII)$$

wherein $R^{14}$ is an alkyl group, alkenyl group, aryl group or arylalkyl group, having 1 to 20 carbon atoms; Q is a hydrogen atom, a $C_{1-20}$ alkoxy group or a halogen atom; and r is a number between 1 and 3, wherein compound (A) is a transition metal compound (A') represented by the following Formula (IV):

$$M^1 R^1{}_a R^2{}_b R^3{}_c R^4{}_d \qquad (IV)$$

wherein $M^1$ is a Ti, Zr, or Hf atom; $R^1$, $R^2$, $R^3$, and $R^4$ may be the same as or different from each other and are independently selected from the group consisting Of hydrogen atom, oxygen atom, halogen atom, $C_{1-20}$ alkyl, $C_{1-20}$ alkoxy, $C_{6-20}$ aryl, tolyl, xylyl, benzyl, $C_{1-20}$ acyloxy, allyl, trimethylsilyl, and (trimethylsilyl)methyl, acetylacetonate, substituted acetylacetonate, dimethyl ether, diethyl ether, tetrahydrofuran, tetrahydrothiophene, ethylbenzoate, acetonitrile, benzonitrile, trimethylamine, triethylamine, tributylamine, N,N-dimethylaniline, pyridine, 2,2'-bipyridine, phenanatholorine, triethylphosphine, triphenylphosphine, ethylene, butadiene, 1-pentene, isoprene, pentadiene, 1-hexene, benzene, toluene, xylene, cycloheptatriene, cyclooctadiene, cyclooctatriene, and cyclooctatetraene; and a, b, c and d are independently an integer of 0 to 4; and wherein said compound (B) is a member selected from the group consisting of triethylammonium tetraphenylborate, tri(n-butyl)ammonium tetraphenylborate, trimethylammonium tetraphenylborate, tetraethylammonium tetraphenylborate, methyltri(n-butyl)ammonium tetraphenylborate, benzyltri(n-butyl)ammonium tetraphenylborate, dimethyldiphenylammonium tetraphenylborate, methyltriphenylammonium tetraphenylborate, trimethylanilinium tetraphenylborate, methylpyridinium tetraphenylborate, benzylpyridinium tetraphenylborate, methyl(2-cyanopyridinium) tetraphenylborate, trimethylsulfonium tetraphenylborate, benzyldimethylsulfonium tetraphenylborate, triethylammonium tetrakis(pentafluorophenyl)borate, tri(n-butyl)ammonium tetrakis(pentafluorophenyl)borate, triphenylammonium tetrakis(pentafluorophenyl)borate, tetrabutylammonium tetrakis(pentafluorophenyl)borate, tetraethylammonium tetrakis(pentafluorophenyl)borate, methyltri(n-butyl)ammonium tetrakis(pentafluorophenyl)borate, benzyltri(n-butyl) ammonium tetrakis(pentafluorophenyl)borate, methyldiphenylammonium tetrakis(pentafluorophenyl)borate, methyltriphenylammonium tetrakis(pentafluorophenyl)borate, dimethyldiphenylammonium tetrakis(pentafluorophenyl)borate, anilinium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, dimethyl(m-nitroanilinium) tetrakis(pentafluorophenyl)borate, dimethyl(p-bromoanilinium) tetrakis(pentafluorophenyl)borate, pyridinium tetrakis(pentafluorophenyl)borate, p-cyanopyridinium tetrakis(pentafluorophenyl)borate, N-methylpyridinium tetrakis(pentafluorophenyl)borate, N-benzylpyridinium tetrakis(pentafluorophenyl)borate, o-cyano-N-methylpyridinium tetrakis(pentafluorophenyl)borate, p-cyano-N-methylpyridinium tetrakis(pentafluorophenyl)borate, p-cyano-N-benzylpyridinium tetrakis(pentafluorophenyl)borate, trimethylsulfonium tetrakis(pentafluorophenyl) borate, benzyldimethylsulfonium tetrakis(pentafluorophenyl) borate, tetraphenylphosphonium tetrakis(pentafluorophenyl) borate, triphenylphosphonium tetrakis(pentafluorophenyl) borate, dimethylanilinium tetrakis(3,5-ditrifluoromethylphenyl)borate, ferrocenium tetraphenylborate, silver tetraphenyl borate, trityl tetraphenylborate, tetraphenylporphyrin manganese tetraphenylborate, ferrocenium tetrakis(pentafluorophenyl)borate, 1,1'-dimethylferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis(pentafluorophenyl)borate, tetraphenylporphyrin manganese tetra(pentafluorophenyl)borate, tetrakis(pentafluorophenyl)boric acid (tetraphenylporphyrin iron chloride), tetrakis(pentafluorophenyl)boric acid (tetraphenylporphyrin zinc), tetrafluorosilver borate, tris(pentafluorophenyl)boron, tris(3,5-di(trifluoromethyl)phenyl)boron, and triphenyl boron.

2. A process according to claim 1, wherein Compound (B) is a compound comprising a cation containing an element selected from the groups of IIIB, VB, VIB, VIIB, VIII, IA, IB, IIA, IIB, IVA and VIIA of the Periodic Table and an anion wherein a plurality of covalently coordinated groups are connected to an element selected from the groups of VB, VIB, VIIB, VIII, IB, IIB, IIIA, IVA and VA of the Periodic Table.

3. The process according to claim 1, wherein said compound (B) is a compound represented by formula (VI) or (VII):

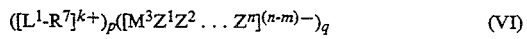

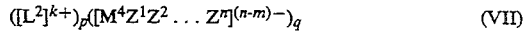

wherein $L^2$ is $M^5 R^8 R^9 M^6$, $R^{10}{}_3C$ or $R^{11}M^6$; $L^1$ is a Lewis base; $M^3$ and $M^4$ are independently an element selected from Groups VB, VIB, VIIB, VIII, IB, IIB, IIIA, IVA and VA of the periodic table; $M^5$ and $M^6$ are independently an element selected from Groups IIIB, IVB, VB, VIB, VIIB, VIII, IA, IB, IIA, IIB and VIIA of the periodic table; $Z^1$ to $Z^n$ are independently a hydrogen atom, dialkylamino group, $C_{1-20}$ alkoxy group, $C_{6-20}$ aryloxy group, $C_{1-20}$ alkyl group, $C_{6-20}$ aryl group, alkylaryl group, arylalkyl group, $C_{1-20}$ halogenated hydrocarbon group, $C_{1-20}$ acyloxy group, organometalloid group or halogen atom; two or more of $Z^1$ to $Z^n$ may form a ring; $R^7$ is a $C_{1-20}$ alkyl group, aryl group, alkylaryl group or arylalkyl group; $R^8$ and $R^9$ are independently a cyclopentadienyl group, substituted cyclopentadienyl group, indenyl group or fluorenyl group; $R^{10}$ is a $C_{1-20}$ alkyl group, aryl group, alkylaryl group or arylalkyl group; $R^{11}$ is a large ring ligand selected from the group consisting of tetraphenylporphyrin and phthalocyanine; m is a valency of $M^3$ and $M^4$ and is an integer of 1 to 7; n is an integer of 2 to 8; k is an ion value number of $[L^1-R^7]$ and $[L^2]$, and is an integer of 1 to 7; and p is an integer of at least 1; and q is specified by the formula:

$$q = (p \times k)/(n-m).$$

4. The process according to claim 1, wherein said organoaluminum compound (D) is an aluminum compound containing at least one branched alkyl group having at least three carbon atoms.

5. The process according to claim 1, wherein said compound ( B ) is a member selected from the group consisting of triethylammonium tetraphenylborate, tri(n-butyl)ammonium tetraphenylborate, trimethylammonium tetraphenylborate, tetraethylammonium tetraphenylborate, methyltri(n-butyl)ammonium tetraphenylborate, benzyltri(n-butyl)ammonium tetraphenylborate, dimethyldiphenylammonium tetraphenylborate, methyltriphenylammonium tetraphenylborate, trimethylanilinium tetraphenylborate, methylpyridinium tetraphenylborate, benzylpyridinium tetraphenylborate, methyl(2-cyanopyridinium) tetraphenylborate, trimethylsulfonium tetraphenylborate, benzyldimethylsulfonium tetraphenylborate, triethylammonium tetrakis(pentafluorophenyl)borate, tri(n-butyl) ammonium tetrakis(pentafluorophenyl)borate, triphenylammonium tetrakis(pentafluorophenyl)borate, tetrabutylammonium tetrakis(pentafluorophenyl)borate, tetraethylammonium tetrakis(pentafluorophenyl)borate, methyltri(n-butyl)ammonium tetrakis(pentafluorophenyl)borate, benzyltri(n-butyl)ammonium tetrakis(pentafluorophenyl)borate, methyldiphenylammonium tetrakis(pentafluorophenyl)borate, methyltriphenylammonium tetrakis(pentafluorophenyl)borate, dimethyldiphenylammonium tetrakis(pentafluorophenyl)borate, anilinium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, dimethyl(m-nitroanilinium) tetrakis(pentafluorophenyl)borate, dimethyl(p-bromoanilinium) tetrakis(pentafluorophenyl)borate, pyridinium tetrakis(pentafluorophenyl)borate, P-cyanopyridinium tetrakis(pentafluorophenyl)borate, N-methylpyridinium tetrakis(pentafluorophenyl)borate, N-benzylpyridinium tetrakis(pentafluorophenyl)borate, O-cyano-N-methylpyridinium tetrakis(pentafluorophenyl)borate, P-cyano-N-methylpyridinium tetrakis(pentafluorophenyl)borate, P-cyano-N-benzylpyridinium tetrakis(pentafluorophenyl)borate, trimethylsulfonium tetrakis(pentafluorophenyl)borate, benzyldimethylsulfonium tetrakis(pentafluorophenyl)borate, tetraphenylphosphonium tetrakis(pentafluorophenyl)borate, triphenylphosphonium tetrakis(pentafluorophenyl)borate, dimethylanilinium tetrakis(3,5-ditrifluoromethylphenyl)borate, hexafluoroarsenic acid triethylammonium, ferrocenium tetraphenylborate, silver tetraphenyl borate, trityl tetraphenylborate, tetraphenylporphyrin manganese tetraphenylborate, ferrocenium tetrakis(pentafluorophenyl)borate, 1,1'-dimethylferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis(pentafluorophenyl)borate, tetraphenylporphyrin manganese tetra(pentfluorophenyl)borate, tetrakis(pentafluorophenyl)boric acid (tetraphenylporphyrin iron chloride), tetrakis(pentafluorophenyl)boric acid (tetraphenylporphyrin zinc), tetrafluorosilver borate, hexafluoroarsenical silver, hexafluorosilver antimonate, tris(pentafluorophenyl) boron, tris (3,5-di(trifluoromethyl)phenyl)boron, and triphenyl boron.

6. The process according to claim 1, wherein said carrier is a member selected from the group consisting of $SiO_2$, $Al_2O_3$, MgO, $ZrO_2$, $TiO_2$, $Fe_2O_3$, $B_2O_3$, CaO, ZnO, BaO, $ThO_2$, silica alumina, zeolite, ferrite, glass fibers, polystyrene, polyethylene, polypropylene, substituted polystyrene and polyarylate, starches, carbon, $MgCl_2$ and $Mg(OEt)_2$.

7. The process according to claim 1, wherein said organoaluminum compound (D) is a member selected from the group consisting of trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride and ethylaluminumsesquichloride.

8. The process according to claim 1, wherein said catalyst has an average particle size of from 2 to 200 μm and a specific surface area of from 20 to 1,000 $m^2/g$.

9. The process according to claim 1, wherein said catalyst has an average particle size of from 10 to 150 μm and a specific surface area of from 50 to 500 $m^2/g$.

10. The process according to claim 1, wherein said transition metal compound (A) is carried on said carrier in such an amount that a transition metal in said transition metal compound (A) is present in an amount of from 0.05 to 10 g per 100 g of said carrier.

11. The process according to claim 10, wherein said transition metal in said transition metal compound (A) is present in an amount of 0.1 to 2 g per 100 g of said carrier.

12. The process according to claim 1, wherein said transition metal compound (A) is a member selected from the group consisting of tetramethylzirconium, tetrabenzylzirconium, tetramethoxyzirconium, tetraethoxyzirconium, tetrabutoxyzirconium, tetrachlorozirconium, tetrabromozirconium, butoxytrichlorozirconium, dibutoxydichlorozirconium, bis(2,5-di-t-butylphenoxy)dimethylzirconium, bis(2,5-di-t-butylphenoxy)dichlorozirconium, and zirconium bis(acetylacetonate).

13. A process for polymerizing an olefin, which comprises contacting an olefin with a catalyst, wherein said catalyst comprises:

(A) a transition metal compound containing a transition metal selected from Group IVB of the periodic table; and (B) a compound capable of forming an ionic complex when reacted with said transition metal compound, wherein compounds (A) and (B) are carried on a carrier (C); and (D) an organoaluminum compound of formula (VIII):

$$R^{14}{}_r AlQ_{3-r} \qquad (VIII)$$

wherein $R^{14}$ is an alkyl group, alkenyl group, aryl group or arylalkyl group, having 1 to 20 carbon atoms; Q is a hydrogen atom, a $C_{1-20}$ alkoxy group or a halogen atom; and r is a number between 1 and 3, wherein said transition metal compound (A) is a member selected from the group consisting of tetramethylzirconium, tetrabenzylzirconium, tetramethoxyzirconium, tetraethoxyzirconium, tetrabutoxyzirconium, tetrachlorozirconium, tetrabromozirconium, butoxytrichlorozirconium, dibutoxydichlorozirconium, bis(2,5-di-t-butylphenoxy)dimethylzirconium, bis(2,5-di-t-butylphenoxy)dichlorozirconium, and zirconium bis(acetylacetonate); wherein said compound (B) is a member selected from the group consisting of triethylammonium tetraphenylborate, tri(n-butyl)ammonium tetraphenylborate, trimethylammonium tetraphenylborate, tetraethylammonium tetraphenylborate, methyltri(n-butyl)ammonium tetraphenylborate, benzyltri(n-butyl)ammonium tetraphenylborate, dimethyldiphenylammonium tetraphenylborate, methyltriphenylammonium tetraphenylborate, trimethylanilinium tetraphenylborate, methylpyridinium tetraphenylborate, benzylpyridinium tetraphenylborate, methyl(2-cyanopyridinium) tetraphenylborate, trimethylsulfonium tetraphenylborate, benzyldimethylsulfonium tetraphenylborate, triethylammonium tetrakis(pentafluorophenyl)borate, tri(n-butyl)ammonium tetrakis(pentafluorophenyl)borate, triphenylammonium tetrakis(pentafluorophenyl)borate, tetrabutylammonium tetrakis(pentafluorophenyl)borate, tetraethylammonium tetrakis(pentafluorophenyl)borate, methyltri(n-butyl)ammonium tetrakis(pentafluorophenyl)borate, benzyltri(n-butyl)ammonium tetrakis(pentafluorophenyl)borate, methyldiphenylammonium tetrakis(pentafluorophenyl)borate, methyltriphenylammonium tetrakis(pentafluorophenyl)borate, dimethyldiphenylammonium tetrakis(pentafluorophenyl)borate, anilinium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, dimethyl(m-nitroanilinium) tetrakis(pentafluorophenyl)borate, dimethyl(p-bromoanilinium) tetrakis(pentafluorophenyl)borate, pyridinium tetrakis(pentafluorophenyl)borate, p-cyanopyridinium tetrakis(pentafluorophenyl)borate, N-methylpyridinium tetrakis(pentafluorophenyl)borate, N-benzylpyridinium tetrakis(pentafluorophenyl)borate, o-cyano-N-methylpyridinium tetrakis(pentafluorophenyl)borate, p-cyano-N-methylpyridinium tetrakis(pentafluorophenyl)borate, p-cyano-N-benzylpyridinium tetrakis(pentafluorophenyl)borate, trimethylsulfonium tetrakis(pentafluorophenyl)borate, benzyldimethylsulfonium tetrakis(pentafluorophenyl)borate, tetraphenylphosphonium tetrakis(pentafluorophenyl)borate, triphenylphosphonium tetrakis(pentafluorophenyl)borate, dimethylanilinium tetrakis(3,5-ditrifluoromethylphenyl)borate, ferrocenium tetraphenylborate, silver tetraphenyl borate, trityl tetraphenylborate, tetraphenylporphyrin manganese tetraphenylborate, ferrocenium tetrakis(pentafluorophenyl)borate, 1,1'-dimethylferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis(pentafluorophenyl)borate, tetraphenylporphyrin manganese tetra(pentafluorophenyl)borate, tetrakis(pentafluorophenyl)boric acid (tetraphenylporphyrin iron chloride), tetrakis(pentafluorophenyl)boric acid (tetraphenylporphyrin zinc), tetrafluorosilver borate, tris(pentafluorophenyl)boron, tris(3,5-di(trifluoromethyl)phenyl)boron, and triphenyl boron; wherein said carrier (C) is a member selected from the group consisting of $SiO_2$, $Al_2O_3$, $MgO$, $ZrO_2$, $TiO_2$, $Fe_2O_3$, $B_2O_3$, $CaO$, $ZnO$, $BaO$, $ThO_2$, silica alumina, zeolite, ferrite, glass fibers, polystyrene, polyethylene, polypropylene, substituted polystyrene and polyacrylate, starches, carbon, $MgCl_2$ and $Mg(OEt)_2$; and wherein said organoaluminum compound (D) is a member selected from the group consisting of trimethylaluminum, triethylaluminum, triisopropylauminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride and ethylaluminumsesquichloride.

* * * * *